United States Patent
Yamashita (10) Patent No.: US 9,342,392 B2
(45) Date of Patent: May 17, 2016

(54) IMAGE FORMING APPARATUS, IMAGE FORMING APPARATUS CONTROL METHOD, AND RECORDING MEDIUM

(71) Applicant: CANON KABUSHIKI KAISHA, Tokyo (JP)

(72) Inventor: Takahiro Yamashita, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 132 days.

(21) Appl. No.: 14/337,654

(22) Filed: Jul. 22, 2014

(65) Prior Publication Data

US 2015/0039937 A1    Feb. 5, 2015

(30) Foreign Application Priority Data

Aug. 1, 2013  (JP) ................. 2013-160552

(51) Int. Cl.
*G06F 11/00*   (2006.01)
*G06F 11/07*   (2006.01)

(52) U.S. Cl.
CPC ........ *G06F 11/0721* (2013.01); *G06F 11/0733* (2013.01); *G06F 11/0793* (2013.01)

(58) Field of Classification Search
CPC ................................. G06F 11/0721
USPC ........................ 714/36, 10–14, 37
See application file for complete search history.

(56) References Cited

U.S. PATENT DOCUMENTS

| | | | | |
|---|---|---|---|---|
| 2002/0085079 A1* | 7/2002 | Maruyama | ........... | H04N 1/0473 347/104 |
| 2013/0195490 A1* | 8/2013 | Iritani | ................ | G03F 15/205 399/67 |
| 2014/0095239 A1* | 4/2014 | Mansfield | ...... | G06Q 10/063114 705/7.15 |
| 2014/0095523 A1* | 4/2014 | Kim | ................ | G06F 17/30289 707/756 |
| 2015/0168210 A1* | 6/2015 | Dorschner | ............ | G01J 1/0429 349/18 |

FOREIGN PATENT DOCUMENTS

JP    2012-118229 A    6/2012

* cited by examiner

*Primary Examiner* — Dieu-Minh Le
(74) *Attorney, Agent, or Firm* — Canon U.S.A., Inc. IP Division (57) ABSTRACT

An image forming apparatus configured to operate in a first power state and a second power state that uses less power than the first power state, in which error information for identifying processing that resolves an error detected during initialization processing is associated and registered in a storage unit, and processing for resolving the detected error is executed based on the error information registered in the storage unit.

13 Claims, 6 Drawing Sheets

| ERROR ID | CAN BE RESOLVED BY RESTARTING | CAN BE RESOLVED BY TRANSITIONING FROM POWER SAVING MODE TO STANDBY STATE |
|---|---|---|
| 1 | YES | YES |
| 2 | NO | NO |
| 3 | YES | NO |
| 4 | YES | YES |
| 5 | NO | NO |

IMAGE FORMING APPARATUS, IMAGE FORMING APPARATUS CONTROL METHOD, AND RECORDING MEDIUM

BACKGROUND OF THE INVENTION

1. Field of the Invention

The present invention relates to an image forming apparatus, an image forming apparatus control method, and a recording medium.

2. Description of the Related Art

Recently, an image forming apparatus can attempt to restart itself if the image forming apparatus detects an error in the apparatus. Consequently, logical errors such as a temporary communication error can be resolved by initialization processing as a result of restarting without requiring a user operation.

Japanese Patent Application Laid-Open No. 2012-118229 discusses an image forming apparatus that determines whether to execute a restart when an error is detected. The execution of restart depends on whether a main control unit in the image forming apparatus can acquire a log from a log storage area. Consequently, by executing a restart when the log storage area is in an abnormal state, the log storage area can be prevented from entering into an even more serious error state.

However, there is a problem in that, when executing restart processing, shutdown/start processing that usually takes tens of seconds or more is performed, causing downtime to the user until startup is completed.

SUMMARY OF THE INVENTION

The present invention is directed to providing a way of resolving errors in a short time without performing restart processing for errors that occur during initialization processing.

According to an aspect of the present invention, an image forming apparatus configured to operate in a first power state and a second power state that uses less power than the first power state, includes a detection unit, a registration unit, and a resolution unit. The detection unit is configured to detect an error that occurs in initialization processing. The registration unit is configured to associate and register in a storage unit error information for identifying processing that resolves the error detected by the detection unit during the initialization processing. The resolution unit is configured to execute processing for resolving the detected error based on the error information registered in the storage unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. The following exemplary embodiment does not limit the invention according to the scope of claims. Further, not all combinations of the features described in this exemplary embodiment are essential to resolving the problem the invention is directed to solving.

<System Configuration Description>

Figure 1:
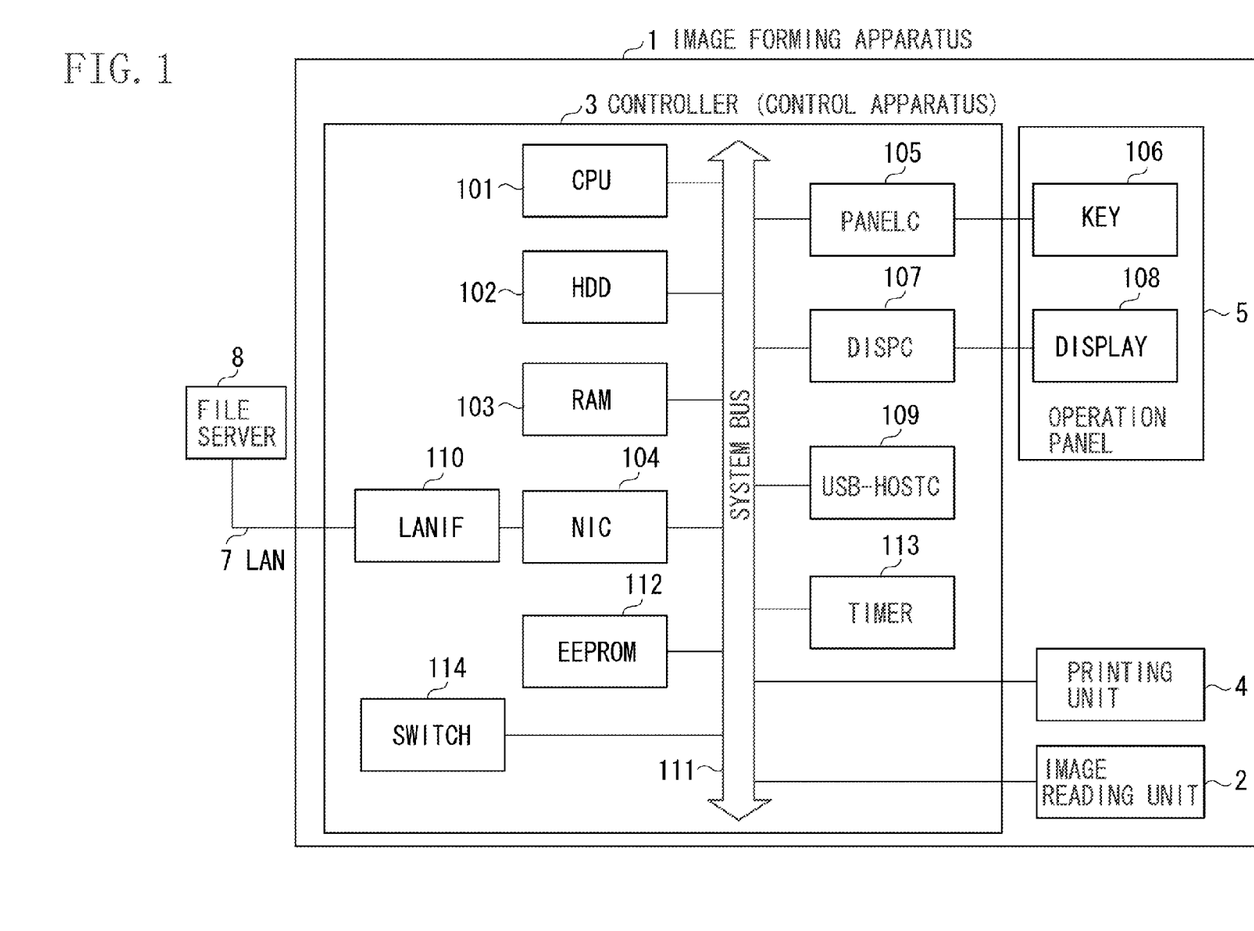
FIG. 1 is a block diagram illustrating a configuration of an image forming apparatus.

FIG. 1 is a block diagram illustrating a configuration of an image forming apparatus according to a first exemplary embodiment. This exemplary embodiment is described for the case of a multifunction apparatus (multifunction peripheral) having, for example, a printer function, a scanner function, a facsimile function, and a storage function.

In FIG. 1, a controller 3 includes a central processing unit (CPU) 101. The CPU 101 performs overall control of each device that is connected to a system bus 111 based on an instructed command set and input values. A hard disk drive (HDD) 102, which is a non-volatile memory device, stores various programs for issuing commands to the CPU 101. The HDD 102 stores data such as a boot loader for selecting an operating system (OS), the OS to serve as the basic software on the system, firmware for realizing/controlling various functions, and a file system for efficiently managing files.

A random-access memory (RAM) 103, which is a volatile memory, is used as a main memory and a work area of the CPU 101. The various programs stored in the HDD 102 are loaded in the RAM 103, and the loaded programs are executed by being interpreted and processed by the CPU 101. A network interface card (NIC) 104, which connects a local area network (LAN) cable to a LAN IF 110, exchanges data with another network device or a file server 8 via a LAN 7. An operation panel 5 includes a touch panel (not illustrated) for instruction input, a key 106, and a display unit (DISPLAY) 108 for displaying system information.

An external input controller (PANELC) 105 detects and controls an instruction input from the touch panel or the key 106. A display controller (DISPC) 107 controls the display of the display unit 108. A universal serial bus (USB) controller (USB-HOSTC) 109 can connect devices that include a USB interface, such as a mass storage device or an integrated chip (IC) card reader. An electrically erasable programmable read-only memory (EEPROM) 112, which is a rewritable, small-capacity, non-volatile memory device, stores setting information of image forming apparatus 1.

A timer 113 includes a secondary battery. The timer 113 not only constantly measures the elapsed time from a reference time point, but also measures the elapsed time based on an instruction from the CPU 101. A switch (SWITCH) 114 can generate a power control instruction to the CPU 101. The CPU 101 performs start processing, shutdown processing, and power state transition processing to a power saving state based on the power control instruction. In an OFF state after shutdown, start processing begins when the switch 114 is turned ON. After the start processing is completed, the image forming apparatus enters a standby state, in which it waits for an instruction from the user. In restart processing, after shutdown processing is completed, start processing is immediately executed.

Further, in a power saving state, power is only supplied to the CPU 101 and the RAM 103. The image forming apparatus transitions to a standby state when, for example, a network packet is received by the LAN IF 110 or the key 106 is operated.

Figure 2:
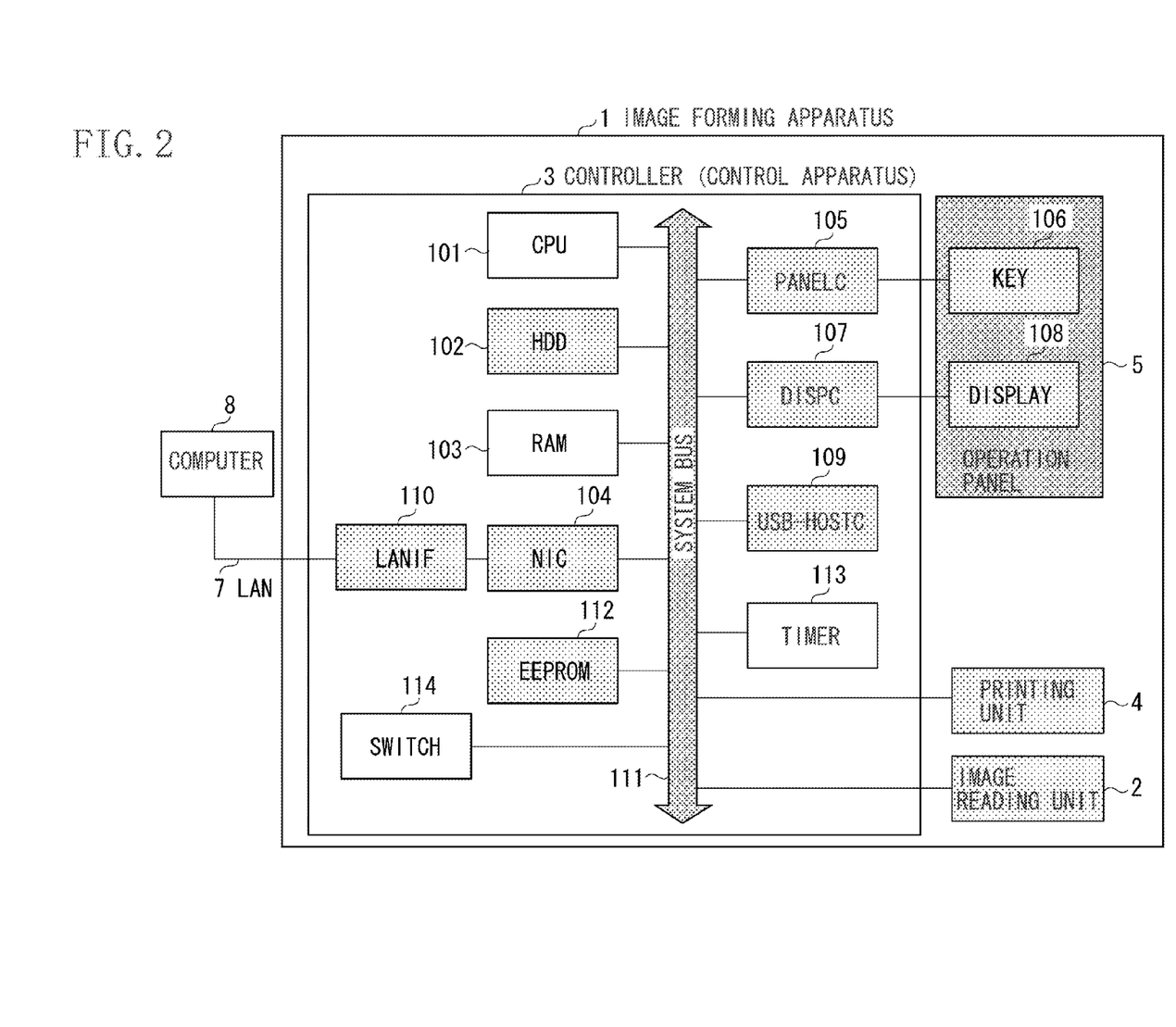
FIG. 2 is a block diagram illustrating a power-on state of the image forming apparatus illustrated in FIG. 1.

FIG. 2 is a block diagram illustrating a power-on state of the image forming apparatus illustrated in FIG. 1. In FIG. 2, units that are the same as FIG. 1 are denoted with the same reference numeral.

In FIG. 2, the hatched regions (hardware blocks) represent regions to which power is not supplied or in which power is limited, in a power saving state.

In the start processing from a power off state until a standby state, initialization processing is executed on all of the hardware blocks. Further, initialization processing is also executed on the above-described hatched regions when transitioning from a power saving state to a standby state. Consequently, if an error is detected regarding these hardware blocks, there is a possibility that the error will be resolved by the initialization processing performed during the restart processing from the power saving state.

In an OFF state, power is not supplied to any of the regions illustrated in FIG. 1. In a standby state, power is supplied to all of the regions illustrated in FIG. 1.

Figure 3:
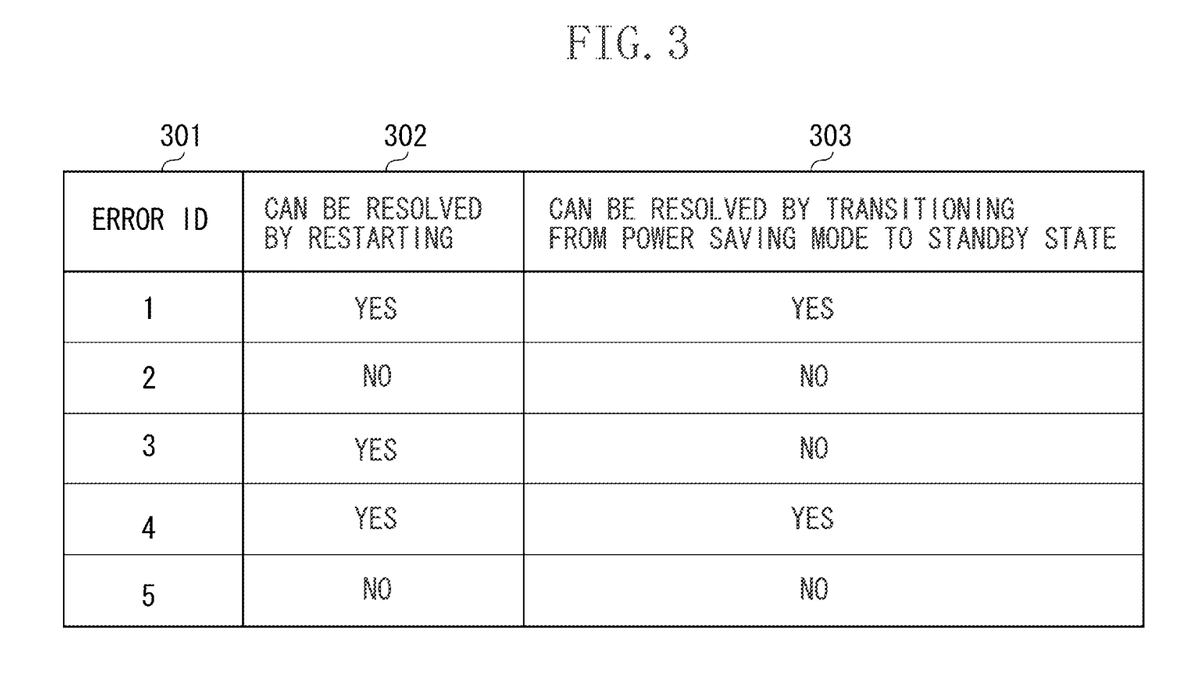
FIG. 3 illustrates an error comparison table stored in the HDD illustrated in FIG. 1.

FIG. 3 illustrates an example of an error comparison table stored in the HDD 102 illustrated in FIG. 1. This example is for a case in which the error type and the restorability therefrom are shown together. In the present exemplary embodiment, error information for identifying the processing that resolves an error occurred during initialization processing is associated with that error and registered in a storage unit (HDD 102).

In FIG. 3, an error ID 301, which is used by the system to uniquely specify an error, is a pre-set ID that is unique to each expected error. A setting value 302 indicates whether an error can be resolved by the initialization processing that occurs during restart processing. A setting value 302 is pre-set for each error type. Similarly, a setting value 303 indicates whether an error can be resolved by the initialization processing that is performed when transitioning from a power saving state to a standby state.

Examples of an error in which both the setting value 302 and the setting value 303 are "No" (error IDs 2 and 5) include an unreadable error caused by physical damage to the HDD 102 and a physical damage error such as damage to parts caused by degradation of a consumable part in the printing unit 4.

Examples of an error in which both the setting value 302 and the setting value 303 are "Yes" (error IDs 1 and 4) include logical errors such as a communication error between the CPU 101 and the printing unit 4.

Examples of an error in which only the setting value 302 is "Yes" (error ID 3) include a data inconsistency error on the RAM 103. Such errors can occur because the data on the RAM 103 is maintained even in a power saving state, because the error information is also subsequently maintained, and because the data needs to be reinitialized and reconfigured by performing restart processing.

Figure 4:
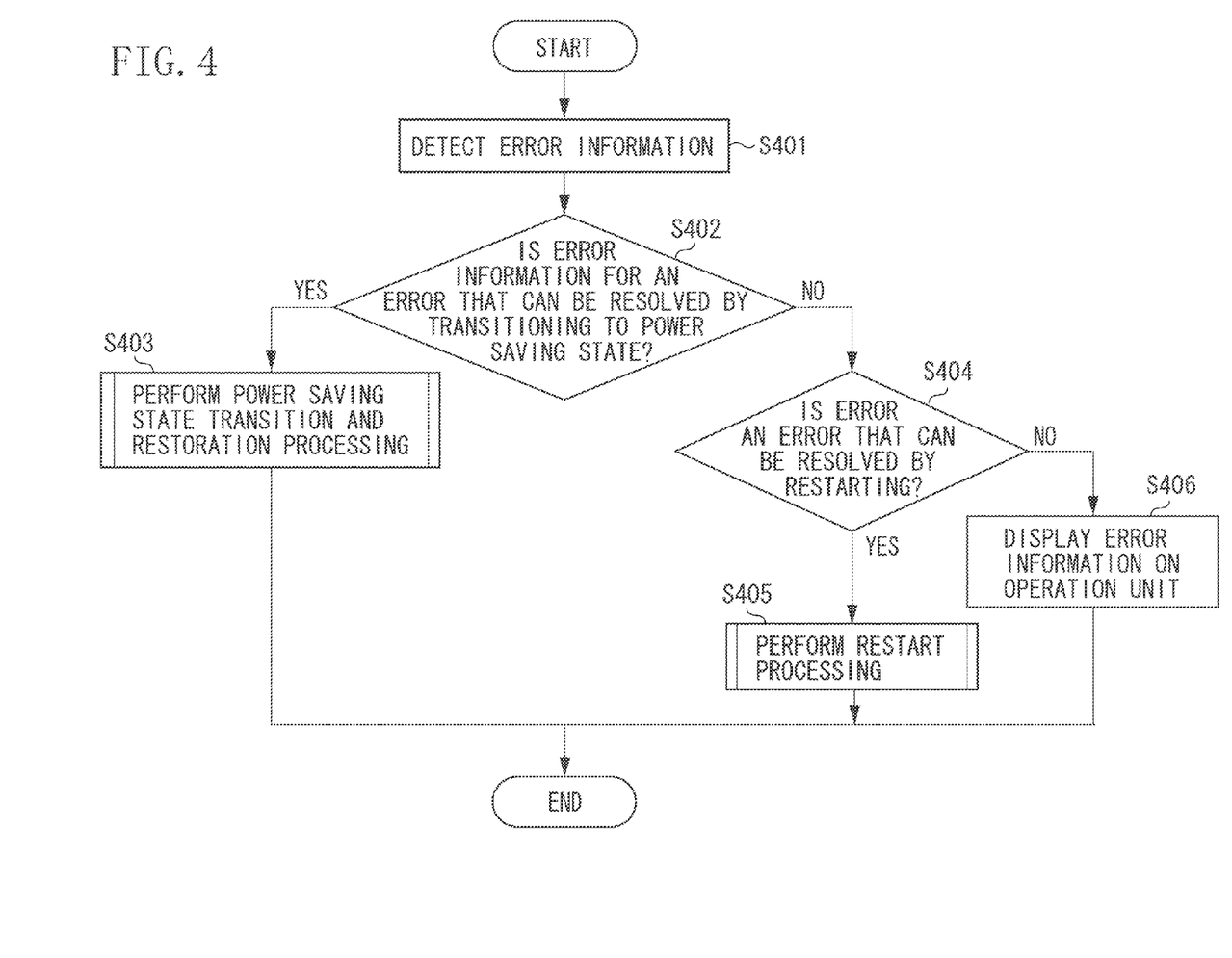
FIG. 4 is a flowchart illustrating an image forming apparatus control method.

FIG. 4 is a flowchart illustrating an image forming apparatus control method according to the present exemplary embodiment. This example indicates error resolving processing performed when an error is detected. In the present exemplary embodiment, processing for handling each error is executed by detecting and comparing error information with the error comparison table illustrated in FIG. 3. The specific processing performed after error detection (restart processing, transition to a power saving state, and restoration processing) will be described in detail below with reference to FIGS. 5 and 6. Further, each step is realized by the CPU 101 executing a control program loaded in the RAM 103.

First, in step S401, the CPU 101 detects error information. Error information detection is realized by the CPU 101 executing an error management module (stored in the HDD 102) to acquire an error ID value that uniquely indicates the detected error.

Next, the processing proceeds to step S402, and from the detected error comparison table (FIG. 3), the CPU 101 determines a process to execute from the followings based on the detected error ID value.

First, in step S402, the CPU 101 determines whether the error can be resolved by a power saving state transition and restoration processing, by referring to the setting value 303 corresponding to the error ID in the error comparison table (FIG. 3).

If it is determined by the CPU 101 that the error can be resolved by a power saving state transition and restoration processing (YES in step S402), in step S403, the CPU 101 executes a power saving state transition and restoration processing. The content of this processing will be described in detail with reference to FIG. 6. Generally, the processing time required for a power saving transition and restoration processing is shorter than the processing time required for restart processing.

On the other hand, if it is determined in step S402 by the CPU 101 that the error cannot be resolved by a power saving state transition and restoration processing (NO in step S402), in step S404, the CPU 101 determines whether the error can be resolved by restart processing, by referring to the setting value 302 corresponding to the error ID in the error comparison table (FIG. 3).

If it is determined by the CPU 101 that the error can be resolved by restart processing (YES in step S404), in step S405, the CPU 101 executes restart processing on the system. The content of this processing will be described in detail below with reference to FIG. 5.

On the other hand, if it is determined in step S404 by the CPU 101 that the error cannot be resolved by restart processing (NO in step S404), in step S406, the CPU 101 renders the current error ID on the display 108 to notify the user that an error has occurred, and then finishes the processing.

Figure 5:
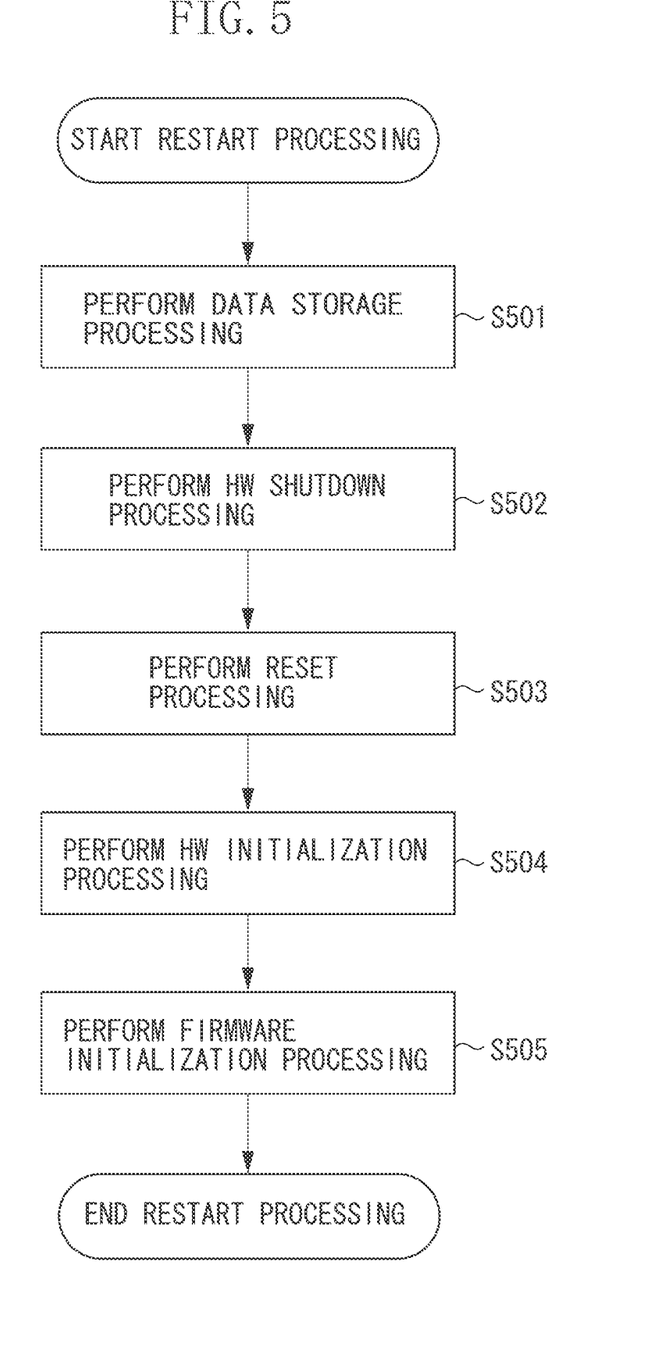
FIG. 5 is a flowchart illustrating an image forming apparatus control method.

FIG. 5 is a flowchart illustrating an image forming apparatus control method according to the present exemplary embodiment. This example shows details of the restart processing performed in FIG. 4. The processing is an example in which, by performing restart processing, the CPU 101 saves the current state and performs shutdown processing and initialization processing of each hardware block in an attempt to resolve the errors denoted by error IDs 1 and 4 in FIG. 3 (an error resolved by data defragmentation by performing memory initialization or an error resolved by hardware initialization).

First, in step S501, the CPU 101 stores in the HDD 102 the data that should be stored and that is on the RAM 103. This processing is performed in order to reset the data on the RAM 103 during the restart processing. Specific examples of such data include various cache values that are temporarily stored on the RAM 103, and setting values changed during operation. In contrast, during the power saving transition processing illustrated in FIG. 6, since the data on the RAM 103 is stored by a self-refresh mechanism, storage processing into the HDD 102 is usually not performed.

Next, in step S502, the CPU 101 performs shutdown processing on all the hardware blocks, and performs pre-reset preparation. For example, the CPU 101 may prohibit writing and execute a setting for stopping rotation of a disk so that the supply of power to the HDD 102 may be safely stopped.

Next, in step S503, the CPU 101 executes reset processing. Consequently, the charge state of the various hardware blocks can be returned to an initial state, and the RAM 103 may be powered down. Further, preparation for executing the subsequent processing can also be performed at this stage by the CPU 101 loading a boot loader and an OS in order from the HDD 102 onto the RAM 103.

Next, in step S504, the CPU 101 executes initialization processing on all hardware blocks. A setting is executed so that the image forming apparatus is in a usable state by writing the setting values in a predetermined order in the register values included in the various hardware blocks.

Lastly, in step S505, the CPU 101 loads the firmware from the HDD 102 on the RAM 103, or reads a setting value stored in step S501, so that the CPU 101 can perform control processing specific to the image forming apparatus 1.

Generally, the opening/initialization processing of the firmware takes up most of the startup time of the CPU 101. Since this processing is omitted in the below-described restoration processing from a power saving state, startup is expected to be quicker.

Figure 6:
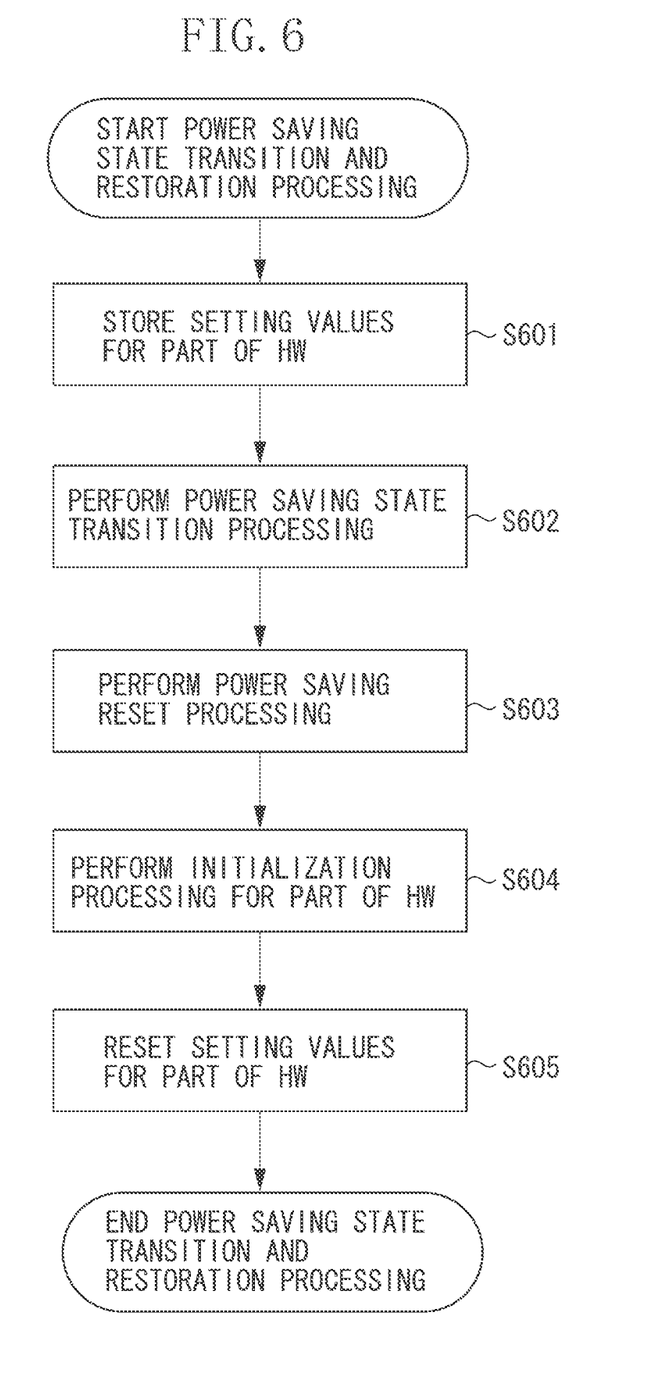
FIG. 6 is a flowchart illustrating an image forming apparatus control method.

FIG. 6 is a flowchart illustrating an image forming apparatus control method according to the present exemplary embodiment. This example shows details of the transition to a power saving state and the restoration processing performed in FIG. 4. A big difference between this processing and the above restart processing is that the data on the RAM 103 is maintained throughout the whole flow, which enables the time taken to read the data to be substantially shortened. Based on this flow, the error indicated by error ID 3 in FIG. 3 (logical communication error between the printing unit 4 and the CPU 101) can be resolved.

First, in step S601, the CPU 101 stores the setting values in the register relating to a part of the hardware blocks on the RAM 103. This expression "part of the hardware blocks" refers to the blocks drawn in white in FIG. 2 excluding the file server 8 and the RAM 103.

Next, in step S602, the CPU 101 performs power saving transition processing. Specifically, the CPU 101 executes processing that maintains the state of the CPU 101 with the minimum level of power by performing a setting so that the RAM 103 is in a self-refreshed state, and cutting the supply of power to the various hardware blocks.

Next, if the CPU 101 has received some kind of restoration request, in step S603, the CPU 101 executes power saving reset processing. In this processing, the CPU 101 prepares for the restarting of a program from a pre-reserved address on the RAM 103 and the execution of the below-described hardware initialization processing by releasing the self-refresh state of the RAM 103. An example of a restoration request includes an electric signal from an operation of the switch 114.

Next, in step S604, the CPU 101 executes initialization processing on a part of the hardware blocks. This expression "part of the hardware blocks" refers to the blocks drawn in grey in FIG. 2. The CPU 101 executes initialization processing corresponding to the above-described restart processing on these hardware blocks.

However, regarding the printing unit 4, initialization processing that is quieter and faster than in the restart processing is executed by performing simple initialization processing and delaying the adjustment processing of the fixing device, which generally tends to produce a driving sound, until it is used.

Next, in step S605, the CPU 101 performs resetting processing by rewriting the register values stored on the RAM 103 for the remaining hardware blocks.

By executing this series of processes, the image forming apparatus 1 can transition to a standby state.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-160552 filed Aug. 1, 2013, which is hereby incorporated by reference herein in its entirety.

What is claimed is:

1. An image forming apparatus configured to operate in a first power state and a second power state that uses less power than the first power state, the image forming apparatus comprising:
    a detection unit configured to detect an error that occurs in initialization processing;
    a registration unit configured to associate and register in a storage unit error information for identifying processing that resolves the error detected by the detection unit during the initialization processing; and
    a resolution unit configured to execute processing for resolving the detected error based on the error information registered in the storage unit.

2. The image forming apparatus according to claim 1, wherein the initialization processing is start processing for transitioning from a power off state to a standby state.

3. The image forming apparatus according to claim 1, wherein the initialization processing is start processing for transitioning from a power saving state to a standby state.

4. The image forming apparatus according to claim 1, wherein the resolution unit is configured to resolve an error detected by transitioning to a power saving state.

5. The image forming apparatus according to claim 1, wherein the resolution unit is configured to resolve the detected error by executing restart processing.

6. The image forming apparatus according to claim 5, further comprising:

a determination unit configured to determine whether the detected error can be resolved by the restart processing executed by the resolution unit; and a notification unit configured to issue an error information notification that an error cannot be resolved if it is determined that the detected error cannot be resolved by the restart processing.

7. A method for controlling an image forming apparatus configured to operate in a first power state and a second power state that uses less power than the first power state, the method comprising:

detecting an error that occurs in initialization processing;

associating and registering in a storage unit error information for identifying processing that resolves the detected error during the initialization processing; and executing processing for resolving the detected error based on the error information registered in the storage unit.

8. The method for controlling an image forming apparatus according to claim 7, wherein the initialization processing is start processing for transitioning from a power off state to a standby state.

9. The method for controlling an image forming apparatus according to claim 7, wherein the initialization processing is start processing for transitioning from a power saving state to a standby state.

10. The method for controlling an image forming apparatus according to claim 7, wherein the resolution resolves an error detected by transitioning to a power saving state.

11. The method for controlling an image forming apparatus according to claim 7, wherein the resolution resolves the detected error by executing restart processing.

12. The image forming apparatus according to claim 11, further comprising:

determining whether a detected error can be resolved by the restart processing executed by the resolution; and issuing an error information notification that the error cannot be resolved if it is determined that the detected error cannot be resolved by the restart processing.

13. A storage medium that makes a computer function as the units according to claim 1.

* * * * *